Oct. 26, 1937.  G. B. MEMMEL  2,097,335
LAMP CONDITION INDICATOR
Original Filed Dec. 10, 1931  4 Sheets-Sheet 1
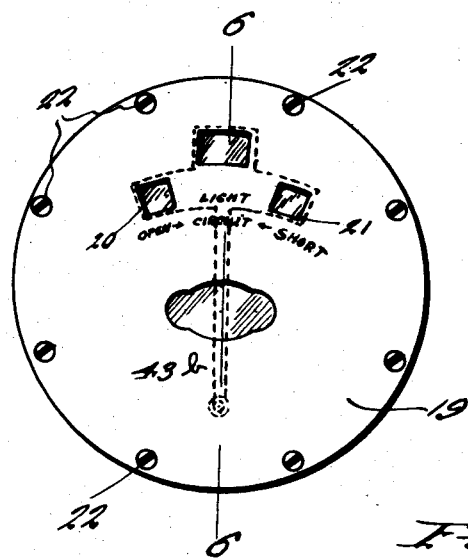
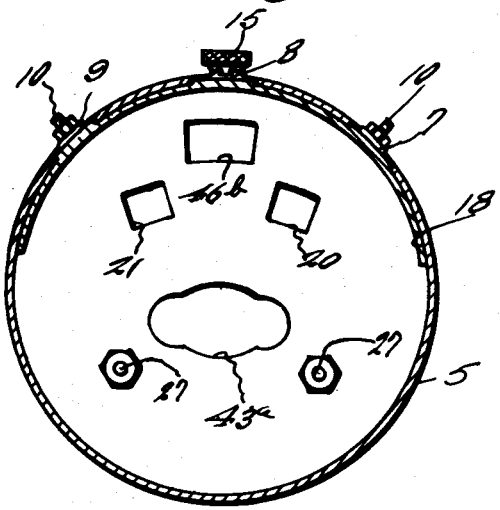
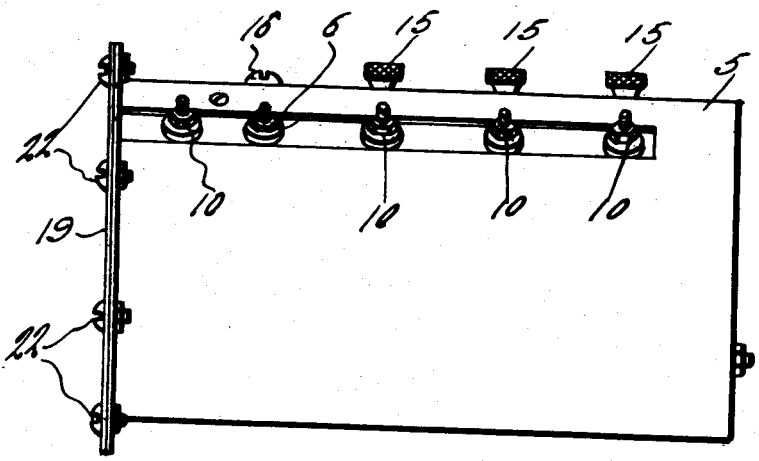
George B. Memmel, Inventor
By Clarence A. O'Brien, Attorney Oct. 26, 1937.  G. B. MEMMEL  2,097,335
LAMP CONDITION INDICATOR
Original Filed Dec. 10, 1931    4 Sheets—Sheet 2
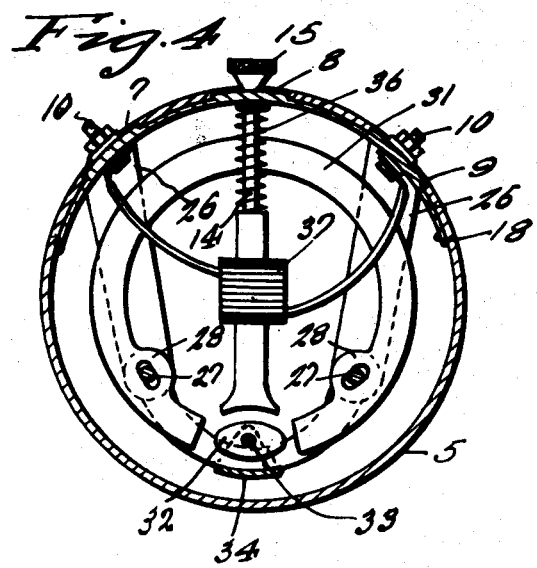
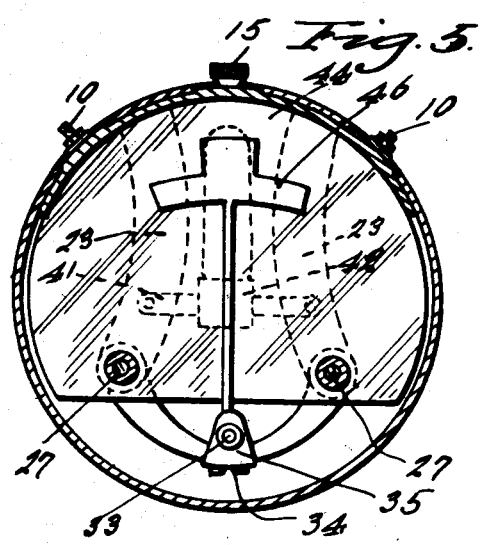
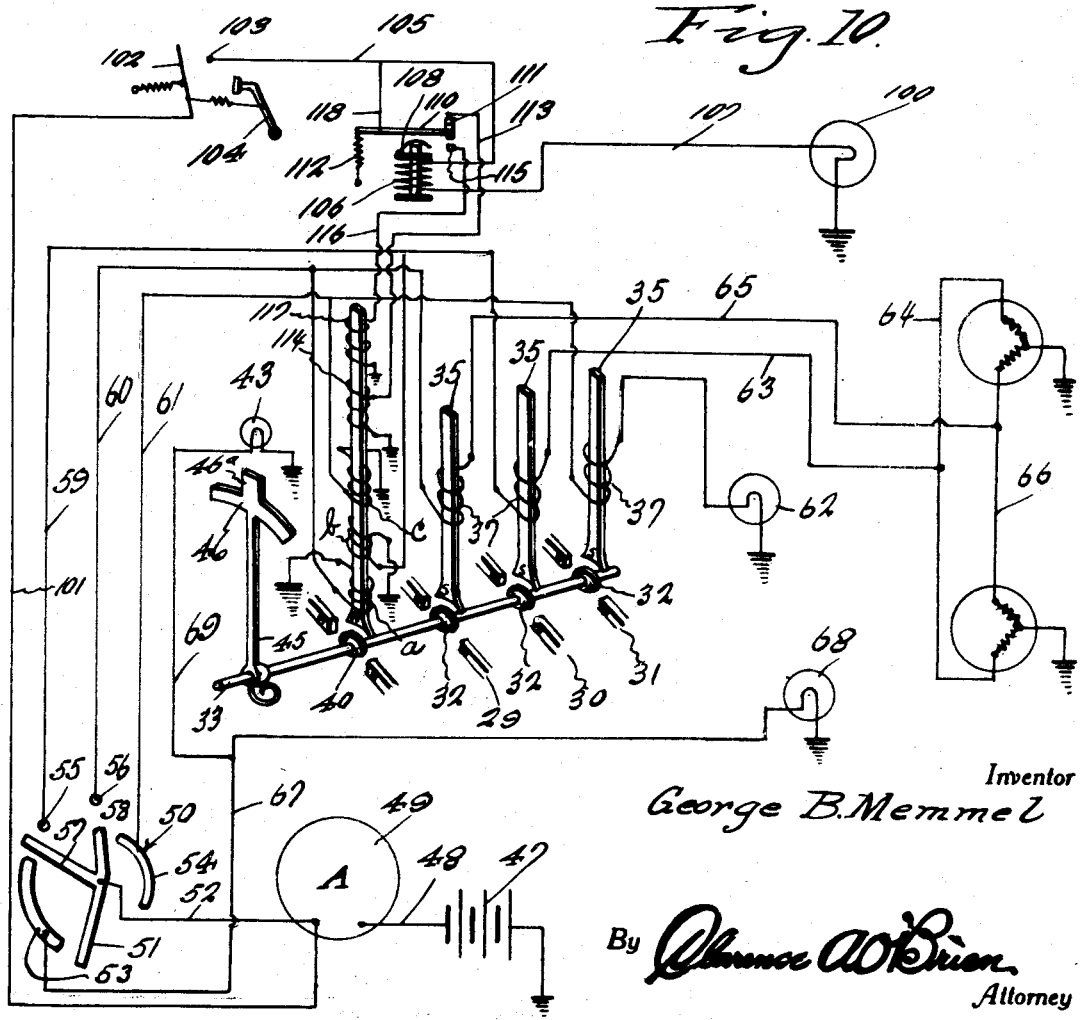
Inventor
George B. Memmel
By Clarence A. O'Brien
Attorney Oct. 26, 1937.　　　　G. B. MEMMEL　　　　2,097,335
LAMP CONDITION INDICATOR
Original Filed Dec. 10, 1931　　4 Sheets-Sheet 3
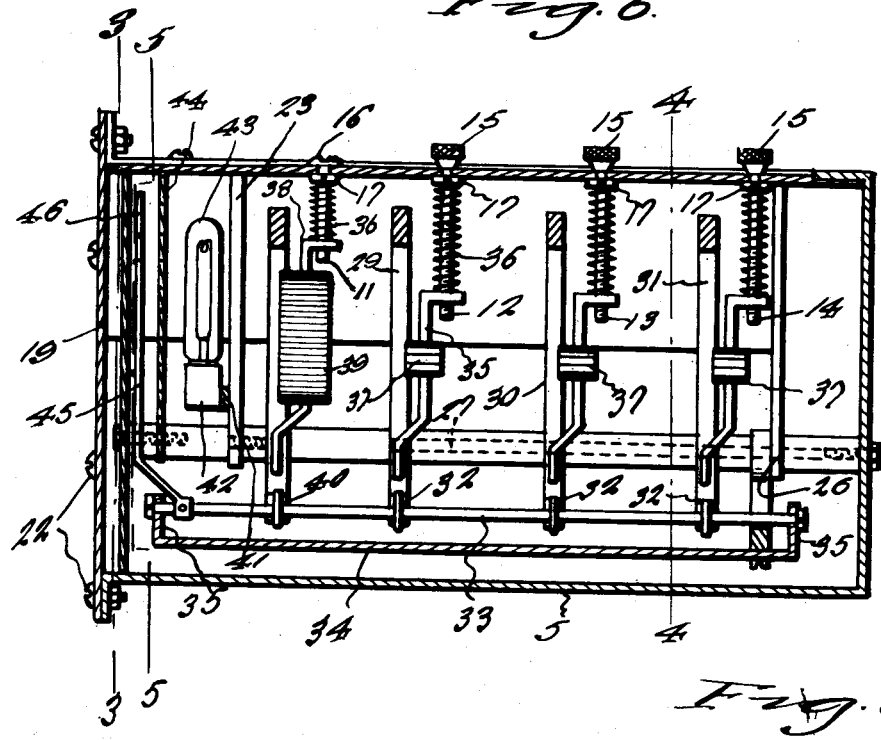
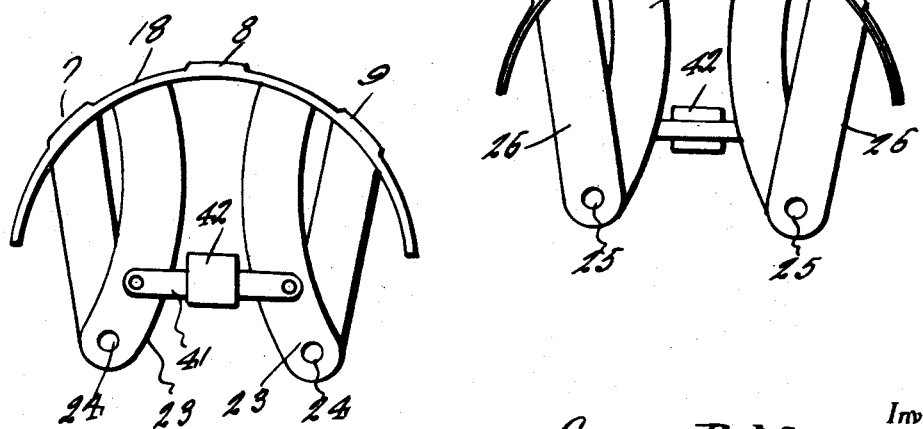
Inventor
George B. Memmel
By Clarence A. O'Brien
Attorney Oct. 26, 1937. G. B. MEMMEL 2,097,335
LAMP CONDITION INDICATOR
Original Filed Dec. 10, 1931 4 Sheets-Sheet 4
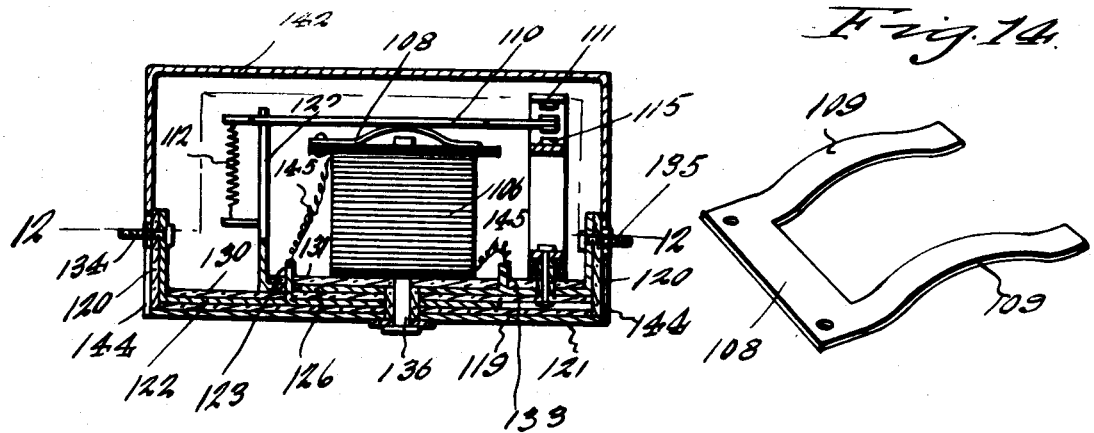
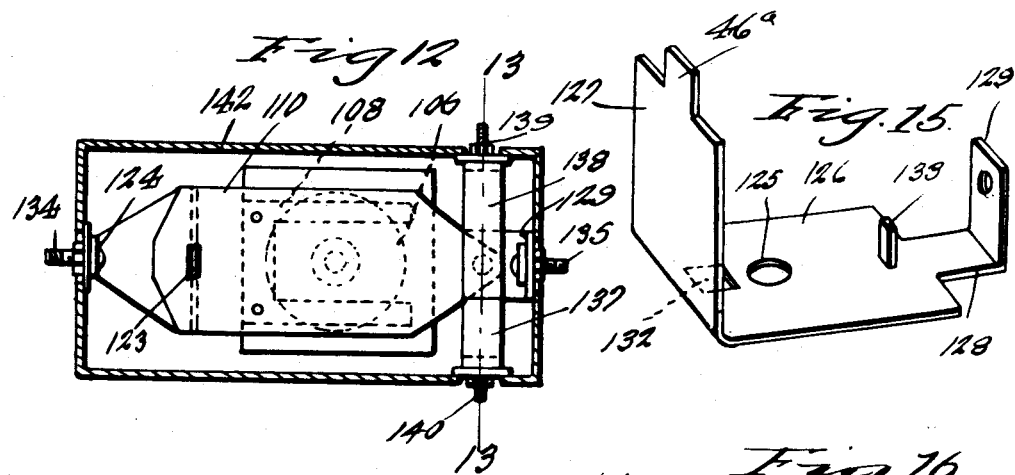
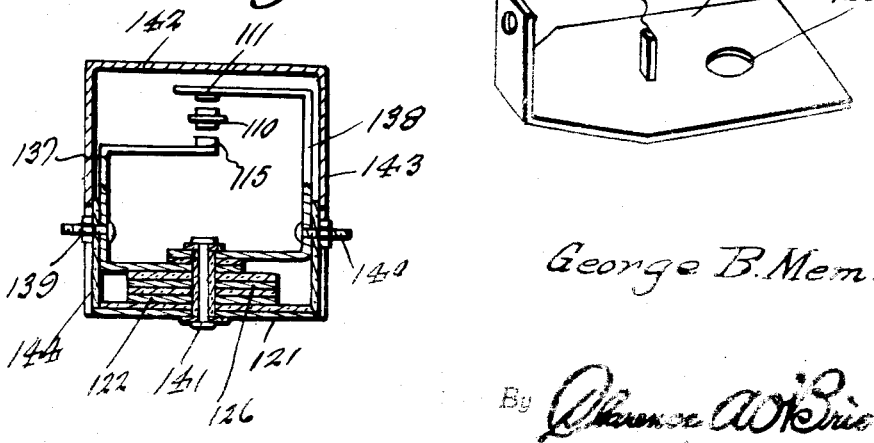
Inventor
George B. Memmel
By Clarence A. O'Brien
Attorney Patented Oct. 26, 1937

2,097,335

UNITED STATES PATENT OFFICE 2,097,335

LAMP CONDITION INDICATOR

George B. Memmel, Milwaukee, Wis., assignor to Theodore W. Hallerberg, Chicago, Ill.

Application December 10, 1931, Serial No. 580,154
Renewed January 22, 1937

5 Claims. (Cl. 177—311)

This invention appertains to new and useful improvements in electrical indicating means, and the same has as its principal object the provision of means for installation on automobiles and other places for indicating the condition of incandescent lamps.

Another important object of the invention is to provide an apparatus which can be readily installed on an automobile for indicating the condition of the different lights on the automobile, such as the bright and dim headlight bulbs and the tail light bulb.

Other important objects and advantages of the invention will become apparent to the reader of the following specification.

In the drawings:—

Figure 1 represents a front elevational view of the apparatus.

Fig. 2 represents a side elevational view of the device.

Fig. 3 represents a vertical sectional view taken on line 3—3 of Fig. 6.

Fig. 4 represents a vertical sectional view taken substantially on line 4—4 of Fig. 6.

Fig. 5 represents a vertical sectional view taken substantially on line 5—5 of Fig. 6.

Fig. 6 represents a longitudinal vertical sectional view through the apparatus.

Fig. 7 represents a front elevational view of the frame.

Fig. 8 represents a rear elevational view of the frame.

Fig. 9 represents a side elevational view of one of the permanent magnets.

Fig. 10 represents a diagrammatic view disclosing the electrical connections between the electrical devices involved.

Fig. 11 represents a vertical sectional view through the stop light relay.

Fig. 12 represents a horizontal sectional view taken substantially on line 12—12 of Fig. 11.

Fig. 13 represents a vertical sectional view taken substantially on line 13—13 of Fig. 12.

Fig. 14 represents a perspective view of the retarding spring.

Fig. 15 represents a perspective view of one of the conductor brackets.

Fig. 16 represents a perspective view of one of the conductor plates.

Referring to the drawings wherein like numerals designate like parts, it can be seen that numeral 5 represents a cylindrical housing open at its front end and closed at its rear end and provided at its top portion with three longitudinally extending slots 6 through which the elongated bosses 7, 8 and 9 protrude as in the manner substantially shown in Fig. 3.

On the bosses 7 and 9 are a suitable number of binding posts 10, while extending through openings in the boss 8 are the screws 11, 12, 13 and 14, the upper ends of the screws 12, 13 and 14 being provided with knurled heads 15, while the upper end of the screw 11 is provided with a slotted screw head 16. Each of these screws 11 to 14 inclusive is provided with a stop collar 17, so as to bear against the inner side of the semi-cylindrical shaped shell 18 of the aforementioned frame so that the screws are rotated without varying their positions with respect to the shell 18.

The screws 11 to 14 inclusive are employed for varying the positions of the magnet cores. The front end of the housing 5 is provided with a removable plate 19 which has a pair of square openings 20—21 in the upper portion thereof. Screws or like members 22 may be employed for securing this plate 19 to the corresponding end of the housing 5. The aforementioned frame which includes the shell 18 has a pair of downwardly curved and diverged arms 23—23 which have openings 24 in the lower ends thereof, registering with like openings 25—25 in the lower ends of the straight arms 26—26 which depend from the rear end of the shell 18.

Disposed between the arms 23 and 26 and through the openings 24 and 25 are the parallel rods 27, which extend through the eyelets 28 on the pole pieces of the permanent magnets 29, 30 and 31. These permanent magnets are circular in shape excepting from the cap to accommodate the armature blocks 32 on the shaft 33, there being one block for each of the magnets 29, 30 and 31, and these armature blocks 32 are of substantially egg shape.

Numeral 34 represents an elongated metallic strap provided with upstanding bearings 35 at its ends for supporting the shaft 33 in the manner substantially shown in Fig. 6.

Located adjacent each of the screws 12, 13 and 14, is a substantially inverted L-shaped core 35 which has an opening in the horizontal portions thereof, through which the corresponding screws 12, 13 or 14 is threadedly disposed and on each of the screws between the horizontal portion of the core 35 and the corresponding collar 17 is a compressible coiled spring 36.

On each of these cores 35 is a small coil 37. The lower end of each of the cores 35 is offset for disposition within the magnetic field of the corresponding permanent magnet 29, 30 or 31, and the lower end is formed arcuately for magnetic affinity with the corresponding armature block 32.

At this point, it is to be understood, that the aforementioned shaft 27 is preferably constructed in section and reduced as shown in dotted lines in Fig. 6 at one end portion so that spaces may be employed thereon for maintaining the magnets 29, 30 and 31 definitely spaced apart.

An inverted L-shaped core 38 has its horizontal portion provided with a threaded opening for receiving the screw 11 and obviously by rotating the screw 11 the core can be elevated or lowered as desired. On this core 38 are the coils 39 and the lower end of the core is in magnetic flux relation with respect to the corresponding armature block 40 on the shaft 33.

As is clearly shown in Fig. 10, the coils 39—39 form shunt windings a, b and c for the coils 37 which are controlled by the screws 12, 13 and 14. Between the arms 23—23 which depends from the shell 18 is the bridge piece 41 supporting the lamp socket 42 in which the lamp 43 is placed and this lamp is located behind the transparent colored screen 44.

Numeral 45 represents an arm which extends upwardly from the shaft 33 and carries an elongated transversely extending shutter 46 at its upper end, which is sufficiently long to cover both of the openings 21 and 20 so that no light from the lamp 43 can be visible therethru.

Referring to Fig. 10, it can be seen that numeral 47 represents the usual automobile battery and from this, the lead 8 connects to one side of the ammeter 49. Numeral 50 represents a special switch which includes the substantially Y-shaped contactor 51, and to this, by way of the conductor 52, is connected the remaining side of the ammeter 49. Numerals 53 and 54 represent arcuate-shaped contact plates stationarily mounted, while between these plates are the stationary contacts 55 and 56, the shank 57 of the contactor 51 being longer than the shank 58 so that the former can engage either one of the contacts 55 or 56 while the shank 58 can only engage the contacts 54.

From the contact 55 extends a conductor 59, which connects to the coil 37 associated with the magnet 30 while extending from the contact 56 is a conductor 60 which leads to one side of the coil 37 which is associated with the magnet 29. A third conductor 61 extends from the contact plate 54 to the coil 37 which is associated with the magnet 31 as in the manner shown in Fig. 10.

The remaining side of the last-mentioned coil 37 connects to the tail lamp 62, while the remaining side of the coil 37 of the magnet 30 is connected by way of the conductor 63 to the dim headlight circuit 64 while the remaining side of the coil 37 associated with the magnet 29 is connected by way of the conductor 65 to the bright headlight circuit 66.

Extending from the contact plate 53 is a conductor 67 which is connected to the dash light 68 and a branch wire 69 extends from this wire 67 to the aforementioned lamp 43 in the indicating apparatus. It can be seen that normally, and before the switch 50 is operated, the shutter 46 is in position obstructing the openings 20 and 21 and also with its projecting plate 46a obstructing the uppermost opening 46b. The front of the casing is provided with another opening 43a to any desired shape, and this is provided with transparent window 43b and through this light from the bulb 43 is constantly visible regardless of the position of the shutter 46.

When the switch 50 is moved so as to close any one of the circuits for energizing any one of the lamps, either the dim filaments or bright filaments, current will pass simultaneously through the corresponding coils 37 on the magnets 35 and also through the shunt-windings a, b and c, and in this manner the position of the armature members 32 will be equalized for maintaining the shutter 46 in a position obstructing view thru any one of the openings 21, 20 and 46b.

Of course, when the bright filament circuit 66 is energized, the filament circuit 64 will be de-energized and of course the intermediate coil 37 and its companion shunt coil b will not be energized. This same accommodation exists when the circuit 64 is energized and the circuit 66 is de-energized, excepting that the corresponding coils of the circuit 64 are energized, while the corresponding coils of the circuit 66 are de-energized.

Thus, it can be seen that in the event, for example, the bright filament circuit is the shorted, in which instance, considerably more current will pass thru the forward end coil 37, in fact more so than its corresponding shunt coil a which will result in the swinging of the corresponding armature element 40 carrying with it the shaft 33 to swing the shutter 46 toward the left (see Fig. 1) to expose the opening 21 which is identified on the front plate 19 to indicate the short. With the shutter in this position, the upper opening 46b will also be exposed, so that light will pass through two openings. The idea is, that in the event there is an open circuit or a short circuit, the shutter will expose two openings either openings 20 and 46b or 21 and 46b, to readily attract the driver's attention.

In the event one of the circuits (for example) circuit 66 is open, no current will pass thru the forward end coil 37, and the currents passing through its companion shunt coil a will influence the corresponding armature element 40 to swing the shaft 33 into the opposite direction to the direction specified when there is a short circuit, so that the shutter 46 will expose the opening 20 and the opening 46b simultaneously, the shutter swinging toward the right (see Fig. 1) in this operation.

When a stop light 100 is used, it is necessary to extend a conductor 101 from the outward side of the ammeter 49 to the switch blade 102 which is operable against the contact 103 and controlled by the usual foot break pedal 104. From the contact 103 extends the wire 105 and this connects to one side of the electromagnet 6 the opposite side of the electro-magnet 106 being connected as at 107 to the stop light 100.

A U-shaped spring 108 has its leg portions 109—109 curved longitudinally and this spring 108 is mounted upon the magnet 106 in the manner substantially shown in Figs. 10 and 11. Numeral 110 represents a swingable armature which normally has its contact end urged upwardly against the contact 111 by the spring 112. A wire 113 extends from this contact 111 to the shunt coil 114 on the core which is also common to the aforementioned shunt windings a, b and c.

Situated below the contact end of the armature 110 is the stationary contact 115 which has a wire 116 extending therefrom which connects to the shunt winding 117 also on the same form which is common to the aforementioned shunt windings.

It can now be seen, that normally, when the switch blade 102 is operated against the contact 103, current will pass through the wires 105 and 107 to the stop light 100, the spring 108 preventing the armature 110 from engaging the contact 115 but nevertheless permitting sufficient movement of the arm to insure spaced relation from the contact 111, while the stop light is energized.

Thus it can be seen, that the armature assumes a midway position between the contacts 111 and 115 when the stop light 100 is energized and while this stop light circuit is in operative condition. However, in the event the stop light circuit becomes open, current will pass through the contactor 102 through the wire 105 and as the coil 106 cannot be energizing, current will flow thru the connections 118 directly to the armature 110, and from there current will pass through the wire 113 to the shunt winding 114. This will overbalance the armature shaft 33 and will swing the shutter 46 toward the right (see Fig. 1) to expose the openings 20 and 46b.

However, in the event of a short circuit, energization of the coil 106 is increased when the switch at the break pedal 104 is energized so that the armature 110 will overcome the resistance of the spring 108 and will engage the contacts 115. Current will then pass from the wire 105 to the armature 110 and from there thru the wire 116 to the shunt coil 117 and this will have the effect of moving the armature shaft 33 in any direction opposite to the direction which it is moved when the stop light circuit is open, that is, in the event the filament of the lamp burns out.

This tail light relay includes a di-electric base plate 119 provided with upstanding end plates 120—120. A plate 121 forms the bottom for the di-electric base 119, while upon the di-electric base 119 is disposed the plate 122 having an upstanding lug 123 thereon and also an upstanding ear 124 at one end. The lug 123 is located adjacent an opening 125 which registers with like openings in the plate 119 and plate 121 as well as the plate 126 which is provided at one end with an upstanding flange 127 on its opposite end is reduced as at 128 and provided with an upstanding gear 129.

The plate 126 is insulated from the plate 122 by the di-electric plate 130 and upon the plate 126 is a di-electric plate 131 having an opening therein for receiving the lug 133 which incidentally extends through the opening 132 over the plate 126. The di-electric plate 131 also has an opening for receiving the lug 133 on the plate 126. The ear 124 is equipped with a binding post 134, while plate 126 has its ear 129 equipped with the binding post 135.

A member 136 extends through the opening 125 in the aforementioned plate and secures the coil 106 thereon.

Numerals 137 and 138 denote vertically disposed U-shaped members, the leg portions of which are disposed horizontally, and each of these U-shaped members 137 and 138 is provided with a binding post which are denoted by numerals 139 and 140 respectively.

The upper ends of the members 137 and 138 carry the aforementioned contacts 115 and 111 and these members 137 and 138 are secured in place by means 141.

Numeral 142 represents a hood having side walls and end walls 143 and each wall has a slot 144 thereon for accommodating the corresponding binding post. Wires 145 extend from the aforementioned lugs 123 and 133 to the corresponding sides of the coil 106. The operation of the foregoing details of the relay has been given hereinbefore.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. An indicating system including, a plurality of electric circuits operable in combination, a pair of coils in each of said circuits, a lamp in series with one of said coils in each circuit, an armature movable within said coils and adapted to assume a predetermined position when the current flow in said coils is normal, another position when said current flow in one of said coils is interrupted or less than normal, and a third position when said current flow in one of the coils is above normal, and visible indicating means connected to and operable by said armature.

2. A system of the character described comprising a source of current, a plurality of lamp circuits, an indicator shaft, magnetic means including a coil in each of the lamp circuits adapted for moving the indicator in one direction, shunt windings each connected by conductor means to a corresponding magnetic coil for operating the indicator in the opposite direction, said shunt windings and magnetic coils being adapted to actuate the shafts selectively, said shunt windings and magnetic coils being connected to the source of current in parallel to each other.

3. In a vehicle lighting system, more than two lighting circuits adapted to be operated in combination, a pair of coils in each of said circuits, a lamp in series with one of said coils in each circuit, an armature movable by said coils and adapted to assume a predetermined position when the closed circuits are normally effective, another position when any one of the circuits is interrupted or less than normally effective, and a third position when the current of any one of the circuits is above normal, and visual indicating means connected to and operable by said armature.

4. In a vehicle lighting system, more than two lighting circuits adapted to be operated in combination, a lamp in each of said circuits, a circuit in parallel with each of said lighting circuits, a coil in each of said circuits and in each of said parallel circuits, an indicator light circuit in parallel with said lighting circuits, a common armature influenced by the current flow in said coils to assume a predetermined position when all of said circuits are closed and normal, and another predetermined position when any one of said circuits is defective, indicating means having predetermined register with said indicator light when said armature assumes either of said predetermined positions, and connection between said indicating means and said armature.

5. In a vehicle lighting system, more than two lighting circuits operable in combination, a lamp in each of said circuits, a circuit in parallel with each of said lighting circuits, a coil in each of said lighting circuits and in each of said parallel circuits, an indicator light circuit in parallel with said lighting circuits, a common armature movable by said coils and adapted to assume predetermined positions when the current flow in said coils is normal and abnormal, visual indicating means illuminated by said indicator light, and connection between said indicating means and said armature.

GEORGE B. MEMMEL.